United States Patent [19]

Gärtner et al.

[11] Patent Number: 4,504,588

[45] Date of Patent: Mar. 12, 1985

[54] PROCESS FOR THE RECOVERY OF WATER-SOLUBLE HYDROFORMYLATION CATALYSTS CONTAINING RHODIUM

[75] Inventors: Roderich Gärtner; Boy Cornils, both of Dinslaken; Ludger Bexten, Hünxe; Dieter Kupies, Duisburg, all of Fed. Rep. of Germany

[73] Assignee: Ruhrchemie Aktiengesellschaft, Fed. Rep. of Germany

[21] Appl. No.: 534,088

[22] Filed: Sep. 20, 1983

[30] Foreign Application Priority Data

Sep. 22, 1982 [DE] Fed. Rep. of Germany ....... 3235029

[51] Int. Cl.$^3$ ............................................. B01J 31/40
[52] U.S. Cl. ....................................... 502/24; 423/22; 502/26; 502/27
[58] Field of Search ................... 423/22; 75/101 BE; 502/24, 26, 27

[56] References Cited

U.S. PATENT DOCUMENTS

| | | | |
|---|---|---|---|
| 3,473,921 | 10/1969 | Schmuckler | 423/22 |
| 3,558,288 | 1/1971 | Burrows | 423/22 |
| 3,960,549 | 6/1976 | MacGregor | 423/22 |
| 3,968,134 | 7/1976 | Gregorio et al. | 423/22 |

FOREIGN PATENT DOCUMENTS 2311388  9/1974  Fed. Rep. of Germany ........ 502/24

OTHER PUBLICATIONS

Borbat et al., "Chem. Absts.", vol. 65, 1966, 11423c.

*Primary Examiner*—Herbert T. Carter
*Attorney, Agent, or Firm*—Jordan B. Bierman

[57] ABSTRACT

To recover a hydroformylation catalyst system containing rhodium and phosphine, the aqueous solution containing the catalyst system is mixed with acid and then extracted with an amine which is dissolved in an organic solvent. The organic phase is separated and treated with the aqueous solution of an inorganic base, thereby recovering the catalyst in essentially pure form as an aqueous solution.

17 Claims, No Drawings

PROCESS FOR THE RECOVERY OF WATER-SOLUBLE HYDROFORMYLATION CATALYSTS CONTAINING RHODIUM

This Application claims priority of German Application No. P 32 35 029.5, filed Sept. 22, 1982.

The present invention relates to the recovery of hydroformylation catalysts containing complex rhodium compounds from their solutions in water.

The use of water as a reaction medium in the hydroformylation of olefins with synthesis gas has the advantage of making it possible to remove the water-insoluble reaction products from the reaction mixture by simple phase separation. In this way, the thermal loading of the aqueous catalyst solution is reduced as there is no need for the aldehydes formed to be stripped off. Therefore, this method can also be used successfully to convert higher olefins, whose high-boiling aldehyde reaction products would necessitate the application of sufficient heat to lead to thermal decomposition of the active hydroformylation catalyst.

A hydroformylation process which operates with water as a reaction medium is described in the DE-PS 26 27 354. Rhodium, in metallic form or as a compound, together with water-soluble phosphines, is used as a catalyst system. The phosphine is soluble in water due to the presence of sulfonic acid groups in the molecule. The phosphines are preferably used in the form of alkali, ammonium or alkaline earth sulfonates.

In continuous process operation, the catalyst solution is subjected to a number of influences which lead to reduction of catalyst activity due to poisoning. In this connection mention should be made of iron carbonyl, which is formed by the action of the synthesis gas on the pipes or the material of which the reactor is constructed. Iron carbonyl compounds are typical catalyst poisons, as are higher-boiling condensation products, which are formed from the aldehydes. Furthermore, the sulfonated phosphines are oxidized to the corresponding sulfonated phosphine oxides or broken down into aromatic sulfonic acids. Phosphine sulfides are also formed to a certain extent from the sulfur-containing compounds present in the synthesis gas and by the reduction of sulfonate groups.

It is therefore necessary to replace the deactivated, aqueous catalyst solution with fresh solution from time to time. The used catalyst solution contains the still active sulfonated phosphine in the form of its alkaline salts as well as rhodium; both must be recovered to keep the process economic.

A process for the separation of aromatic sulfonic acids from sulfuric acid and sulfates, which are all present in aqueous solution, is described in the U.S. Pat. No. 3,919,703. It discloses treating the aqueous solution with a water-insoluble aliphatic amine, in which the aromatic sulfonic acids dissolve, and then separating the water and amine phases. Finally, the reference indicates that the aromatic sulfonic acids are extracted from the amine. The separation and recovery of a metal, namely rhodium, present in very low concentrations, from a second metal, namely, iron—which belongs to the same group of the periodic table—is not described.

A process for the separation of water-soluble salts of aromatic sulfonic acids is the subject of EP-A 00 41 134. The sulfonating mixture, already diluted with water, is treated with an amount of water-insoluble amine chemically equivalent to the sulfonic acid groups present, the amine forming a lipophilic salt with the sulfonic acid. Then the two phases which are formed are separated and the phase containing the ammonium salt is treated with a stoichiometric amount of water-soluble base, the aromatic sulfonic acid salt of which is to be prepared. The aromatic sulfonic acid salt is obtained in aqueous solution from which it can be isolated. It is imperative for the practice of this process as disclosed that the ammonium salt be liquid at a temperature below the boiling point of the aqueous sulfuric acid.

In DS-PS 29 11 193, a process for the recovery of rhodium from residues of the oxo synthesis is described. Here the rhodium is precipitated by the addition of elemental sulfur or sulfur-releasing compounds, and the precipitate is worked up in a known manner by means of a pyrosulfate melt, via rhodium sulfate, to rhodium or rhodium compounds. This process is particularly suitable for the work-up of residues which contain free triphenyl phosphine in addition to rhodium. However, a major disadvantage is that the rhodium is not recovered in a form which can be reused as a hydroformylation catalyst directly, but first has to be reprocessed. It is not possible to recover the phosphine ligand with this process.

An object of this invention is the development of a process which permits direct recovery of the catalyst system containing water-soluble rhodium and phosphine.

The aforementioned problem is solved by the present process for the recovery of water-soluble rhodium and phosphines from used catalyst systems containing them, especially from systems also having alkali metal and/or alkaline earth metal and/or ammonium ions. An amount of acid, chemically equivalent to the sulfonic acid groups already present, is first added to the aqueous solution of the catalyst system. Then this is contacted with a solution of an amine in an organic solvent. The resultant organic phase is vigorously mixed with an aqueous solution of an inorganic base and finally the aqueous phase is separated out.

The process according to the invention not only insures that both the rhodium and phosphines are almost quantitatively recovered, but also that the impurities, such as iron and other metal compounds, halides, phosphine oxides, phosphine sulfides, and undesired aromatic sulfonic acids, are removed. Used catalysts containing impurities and inactive substances can be fed into the purification process without any previous work-up. The procedure can be described as follows:

The aqueous catalyst solution to be purified is first acidified. It is mixed with at least as many acid equivalents as are necessary for the conversion of the acid residues present as salts into the acid form. An excess of acid is not detrimental to the process but is superfluous. The amount of acid required should be previously determined in an analysis. All acids which are capable of converting the aromatic sulfonic acid salts sufficiently into the free sulfonic acids and which, owing to their hydrophilic character, are less easily extracted than the desired sulfonic acids under the same conditions, are suitable.

Both inorganic and organic acids can be used. Such inorganic acids, as hydrochloric, sulfuric, nitric, phosphoric, and such organic acids as acetic, formic, and oxalic, are suitable. Many others will be apparent to those skilled in the art. Sulfuric acid or acetic acid are preferred. When multivalent acids are used, it is practical to base the amount of acid required to convert the catalyst solution solely on the conversion of the first acid stage.

According to a special embodiment of the invention, the required amount of acid is added to the catalyst solution in the form of an amine salt. The salts of the amines used as extraction agents are particularly suitable for this purpose, since the desired amine salts of the aromatic sulfonic acids are thereby formed immediately. The salts of amines which are also used for the extraction are suitable for this purpose.

After the acidification of the catalyst solution, the rhodium and sulfonated aromatic phosphines are extracted in a second stage with the aid of an extraction amine. The amines used as extraction media are liquid and preferably as insoluble in water as possible.

The salt formed from the amine and the sulfonic acid normally has low solubility in water. If the solubility of the salt formed is greater in water than in the extraction medium, the amine is not well suited for extraction.

The following relatively water-insoluble amines which form a sufficiently lipophilic salt with the sulfonic acid are suitable: relatively water-insoluble homo- and heterocyclic, aliphatic, aromatic, and araliphatic amines, preferably open-chained, branched or unbranched aliphatic amines with a total of 10 to 60—more preferably 13 to 36—carbon atoms; e.g. iso-tridecylamine (mixture of isomers), di-2-ethyl hexylamine, tri-n-hexylamine, tri-n-octylamine, tri-iso-octylamine, tri-iso-nonylamine (mixture of isomers), di-iso-nonyl-2-phenylpropylamine, iso-nonyl-di-2-phenylpropylamine, tri-iso-tridecylamine (mixture of isomers), N,N-dimethyl-hexadecylamine, and N,N-dimethyl-octadecylamine. Isotridecylamine, tri-n-octylamine, and tri-iso-octylamine have been found to be particularly useful as extraction agents.

The amines as such can be used as extraction media. However, it is better to dissolve them in an organic solvent which is either immiscible or only slightly miscible with water. Advantageously, the amine is present in the organic solvent in an amount of about 0.5 to about 50% by volume. The concentration is mainly restricted by the solubility of the amine sulfonic acid salt in the solvent, which as to be observed during the extraction, and by the viscosity of the salt solution formed. The choice of a suitable diluent is made according to physical rather than chemical aspects.

The diluent should satisfy the following requirement, although adherence thereto is not critical. It should have low water solubility, its flash point should be above 25° C., and losses due to evaporation should be low. Furthermore, it should show no tendency to form emulsions and should only be carried over into the aqueous phase to a slight extent. Moreover, it should be inert, non-toxic and reasonably priced, exhibit good hydrodynamic behavior, and have only a low extraction capability for the impurities contained in the catalyst solution. Suitable solvents are fractions resembling kerosene, aromatic fractions, $C_4-C_{20}$ alcohols, $C_8-C_{20}$ ethers; especially suitable are toluene or fractions resembling kerosenes. With their aid, it is not only possible to separate inorganic materials, such as iron compounds and halides, but also the catalytically inactive substances, such as phosphine oxides, phosphine sulfides, and aromatic sulfonic acids.

The amine is used in an amount of about 0.1 to about 1.0 mole and, in particular about 0.25 to about 0.75 mole, per equivalent of sulfonic acid groups.

According to an especially preferred embodiment of the invention, the extraction of rhodium and the phosphines does not take place in a single step, the amount of amine being added to the acidified catalyst solution in parts. In the first stage, 0.25 to 0.5 mol of the amine per equivalent of sulfonic acid groups is added to the solution, in the second stage a further 0.25 to 0.5 mol, is introduced and, if necessary, the remaining amine can be added to the acidified catalyst solution in a third stage. With this variant, more than 90% of the rhodium present in the solution is separated out in the first stage. It is also possible to use different amines in the different stages to extract the components of the solution more selectively.

During the extraction, all of the rhodium and the water-soluble phosphine are carried over into the amine phase. The acidified aqueous phase then contains only the water-soluble inorganic and organic impurities and can be disposed of.

In order to recover the rhodium and phosphines now contained in the organic amine phase, the amine phase is vigorously mixed with the aqueous solution of an inorganic base. Inorganic bases which are useful include sodium hydroxide, potassium hydroxide, sodium carbonate, potassium carbonate and alkaline earth hydroxides; in particular sodium hydroxide and potassium hydroxide. Other suitable bases will be apparent to the ordinarily skilled practitioner. The base may be used as a 0.1 to 10% solution by weight and is employed in a stoichiometric amount relative to the amine present or in a slight excess thereof. In the course of the treatment, the rhodium and phosphines re-enter the aqueous phase and an aqueous solution is formed which can be re-used as a catalyst solution either directly or after appropriate dilution or replenishment.

Extraction with an amine solution and re-extraction with an aqueous liquor can be carried out according to known methods; e.g. in a continuously operating counter-current extraction process.

In practice, the process of this invention is carried out by acidifying the used aqueous catalyst solution with the required amount of acid. The amine, dissolved in a solvent, if necessary, is then added. By intensive mixing of the two practically immiscible phases, a high transfer of the rhodium, as well as the phosphines, into the amine phase is insured. The two phases are left to settle and the upper oganic phase is separated from the lower aqueous one. The organic phase is then treated with an aqueous solution of an appropriate inorganic base. It is also important here for the two immiscible phases to be mixed as intensively as possible so that the rhodium and the phosphines largely transfer from the organic to the aqueous phase. The aqueous phase is then separated and can be used directly as a catalyst solution in synthesis reactions.

The present invention is illustrated but not limited by the following Examples:

Example I 100 g of a used catalyst solution containing
0.155 g rhodium
0.160 g iron
9.0 g Na-triphenylphosphine-trisulfonate (TPPTS)
22.0 g Na-triphenylphosphine oxide-trisulfonate (TPPOTS)
2.0 g Na-triphenylphosphine sulfide-trisulfonate (TPPSTS)

4.0 g Na-triphenylphosphine oxide-disulfonate (TPPODS) per kg solution is shaken for 30 minutes in a separating funnel with 17.04 g of extraction medium in 82.96 g of toluene. The extraction medium is prepared by dissolving 100 g of triisooctylamine and 30 g of sulfuric acid in 900 g of toluene.

The amount of amine used as an extraction medium corresponds to 0.25 mol amine per equivalent of sulfonate. After separation of the toluene phase, the extraction is repeated 5 times with the same amounts of extraction medium and toluene.

The organic phases are mixed separately with 0.1N aqueous NaOH solution under intensive stirring in a three-necked flask with a drain valve at the bottom until a pH-value of 8 is attained. The aqueous phases containing the entire catalyst system are then separated from the organic phases and can, if necessary, be reused in the synthesis after dilution with water.

Example II 100 g of the used catalyst solution of Example I is acidified with 39.3 g of 10% sulfuric acid and then extracted 6 times with 16.54 g of extraction medium (comprising 100 g of triisooctylamine and 900 g of toluene) dissolved in 60 g of toluene. The separated organic phases are treated as in Example I.

Example III 100 g of the used catalyst solution of Example I is mixed with 49.2 g of 10% sulfuric acid. The acidified solution is treated as in Example I.

Example IV 100 g of the used catalyst solution of Example I is mixed with 20.2 g of 10% sulfuric acid. The acidified solution is extracted a total of 6 times with 16.54 g of extraction medium (comprising 100 g of tri-n-octylamine and 900 g of toluene) dissolved in 60 g toluene. The organic phases are treated as in Example I.

Example V 100 g of the used catalyst solution of Example I is acidified with 20.2 g of 10% sulfuric acid and then extracted 6 times with 16.54 g of extraction medium (38.1 g of tri-n-hexylamine and 461.9 g of toluene) dissolved in 60 g of toluene. The amount of amine used as an extraction medium corresponds to 0.25 mol amine per equivalent sulfonate.

Otherwise the process is the same as in Example I.

Example VI 100 g of the used catalyst solution of Example I is acidified with 20.2 g of 10% sulfuric acid and then extracted 6 times with 16.54 g of extraction medium (52.4 g of tri-n-butylamine and 947.6 g of toluene) dissolved in 60 g of toluene. The amount of amine used as an extraction medium corresponds to 0.25 mol amine per equivalent sulfonate. Otherwise the process is the same as in Example I.

Surprisingly, with the extraction medium used, no rhodium is extracted from the aqueous solution of the catalyst system.

Example VII 100 g of the used catalyst solution of Example I is acidified with 20.2 g of 10% sulfuric acid and then extracted 6 times with 16.54 g of extraction medium (34.14 g of di-2-ethylhexylamine and 465.86 g of toluene) dissolved in 60 g of toluene. The amount of amine used as an extraction medium corresponds to 0.25 mol per equivalent sulfonate. Otherwise the process is the same as in Example I.

The results of Examples I to VII are compiled in Table 1. They show that the ratio of added acid to sulfonate groups present has little influence on the extraction effect (I to III) but that there are differences between the amines (IV, V, VII compared with VI). Through the use of sufficiently hydrophobic amines, i.e. amines which are more hydrophobic than tri-n-butylamine, rhodium is extracted from the used aqueous catalyst solutions in greater quantities and with higher selectivity.

TABLE 1

| Examples | I | | II | | III | | IV | | V | VI | VII | |
|---|---|---|---|---|---|---|---|---|---|---|---|---|
| amine in extraction medium | Tri-isooctylamine | | | | | | tri-n-octyl amine | | tri-n-hexyl amine | tri-n-butyl amine | di-2-ethyl hexylamine | |
| added H$_2$SO$_4$ (mol) | 6 × 0.27+ | | 2 | | 10 | | 1.1 | | 1.1 | 1.1 | 1.1 | |
| —SO$_3$H in solution (mol) | 1 | | 1 | | 1 | | 1 | | 1 | 1 | 1 | |
| Rh and Fe in solution ++ (mg/kg) | Rh | Fe | Rh | Fe | Rh | Fe | 155 Rh Rh | Fe | 160 Fe Rh | Rh | Rh | Fe |
| 1st reextract +++ | 64.6 | 1.4 | 105.3 | 1.9 | 103.9 | 2.1 | 92.9 | 2.2 | 95.5 2.9 | | 85.6 | 2.2 |
| 2nd reextract | 62.0 | 1.8 | 27.2 | 3.5 | 26.9 | 2.3 | 33.7 | 2.0 | 25.4 3.5 | | 53.3 | 4.5 |
| 3rd reextract | 6.7 | 2.0 | 6.1 | 2.5 | 3.0 | 2.1 | 6.6 | 3.1 | 10.7 2.5 | | 6.9 | 3.1 |
| 4th reextract | 6.0 | 1.5 | 5.9 | 2.1 | 3.0 | 2.3 | 6.7 | 2.3 | 8.6 4.2 | | 2.8 | 2.5 |
| 5th reextract | 8.4 | 1.7 | 5.5 | 1.6 | 2.5 | 4.1 | 9.6 | 3.6 | 7.8 1.3 | | 2.2 | 2.1 |
| 6th reextract | 2.6 | 1.3 | 1.2 | 1.4 | 1.3 | 1.2 | 2.1 | 2.5 | 3.4 2.5 | | 1.8 | 2.9 |
| Rh and Fe in solution after extraction (mg/kg) | (93.2 g) 4.2 | 150 | (128.4 g) 1.5 | 113 | (138.8 g) 5.1 | 102 | (109.6 g) 1.2 | 130 | (108.4 g) 1.1 131 | (102.4 g) 2.6 | (108.0 g) 1.0 | 142 |
| Rh in organic phase | <0.5 | | <0.5 | | <0.5 | | <0.5 | | <0.5 | <0.5 | <0.5 | |

+ as amine salt
++ solution = used catalyst solution
+++ reextractract = rhodium salt in aqueous solution recovered from organic phase, topped up to 100 g

Example VIII 100 g of the used catalyst solution of Example I is mixed with 20.2 g of 10% sulfuric acid. A solution of 61.88 g of isotridecylamine in 438.12 g of toluene is used as an extraction medium. The catalyst solution which has been acidified with sulfuric acid is extracted in three consecutive extraction steps.

1st Extraction 7.54 g of extraction medium and 70 g of toluene (0.25 mole amine/equiv. sulfonate)
2nd Extraction
7.54 g of extraction medium and 70 g of toluene (0.25 mol amine/equiv. sulfonate) and
3rd Extraction
15.08 g of extraction medium and 70 g of toluene (0.50 mol amine/equiv. sulfonate).

The catalyst system consisting of rhodium and phosphine is extracted from the toluene solutions by the addition of as much 1N caustic soda as is necessary to attain a pH value of 12.0. The results are listed in Table 2.

As can be seen from the Table, rhodium can be largely separated from TPPOTS by partial amine extraction. At the same time nearly all the TTPPTS is recovered.

TABLE 2

|  | Example VIII | | | | | |
|---|---|---|---|---|---|---|
| content of the catalyst solution | Rh (mg/kg) | Fe (mg/kg) | TPP TS (%) | TPP OTS (%) | TPP STS (%) | TPP ODS (%) |
|  | 155 | 160 | 0.9 | 2.2 | 0.2 | 0.4 |
| extracted with amine (25% of theoretical amount) 1st reextract + | 83.9 | 6.5 | 0.60 | 0.11 |  | 0.08 |
| extracted with amine (25% of theoretical amount) 2nd reextract + | 56.4 | 10.5 | 0.25 | 0.24 |  | 0.12 |
| extracted with amine (50% of theoretical amount) 3rd reextract + | 6.7 | 22.3 | 0.05 | 0.65 | 0.10 | 0.18 |
| catalyst solution after extraction (114.6 g) | 2.4 | 104 |  | 1.18 | 0.10 | <0.05 |
| combined toluene solutions 1-3 after reextraction | 1.5 | 2.1 |  |  |  |  |

+ topped up to 100 g

Examples IX–XXVI

A used catalyst solution containing per kg of solution
345 mg Rh,
270 mg Fe,
19.2 g $Na_3$-triphenyl-phosphine trisulfonate,
38.0 g $Na_3$-triphenyl-phosphine oxide trisulfonate,
0.7 g $Na_3$-tri-phenylphosphine sulfide trisulfonate,
2.0 g $Na_2$-triphenylphosphine disulfonate and
7.7 g $Na_2$-triphenylphosphine oxide disulfonate
is employed.

Three 100 g samples of the catalyst solution are each mixed with 6 g of concentrated sulfuric acid. The first sample is extracted with 13.83 g of triisooctylamine, the second with 9.44 g of di-2-ethylhexylamine, and the third with 7.80 g of isotridecylamine, corresponding to 1.0 mol amine per equivalent sulfonate. Each amine is dissolved in 100 ml of the solvent listed in Table 3.

The catalyst system is reextracted from the organic phases by the addition of 1N caustic soda until a pH value of 8.0 or, in the case of isotridecylamine, 12.0 is attained.

All tests are carried out under a nitrogen atmosphere. The solvents used have been previously heated to their respective boiling points under nitrogen.

When an aliphatic hydrocarbon mixture (boiling range 140°–170° C.), cyclohexane, or diethylether are used as solvents, two separate organic phases are obtained. The lighter free-flowing phase is largely free of rhodium, the heavier more viscous phase contains most of the rhodium. Both phases are introduced simultaneously into the reextraction step.

The results of the experiments are compiled in Table 3. They show that a wide variety of inert solvents can be used as diluents for the amine. The figures apply to 100 g of reextract and 100 g of waste water.

TABLE 3

|  | Examples IX-XXVI | | | | | | |
|---|---|---|---|---|---|---|---|
| content of catalyst solution |  | Rh mg/kg | TPP TS % | TPP OTS % | TPP STS % | TPP DS % | TPP ODS % |
|  |  | 345 | 1.92 | 3.80 | 0.07 | 0.20 | 0.77 |
| (a) triisooctylamine | | | | | | | |
| n-butanol | reextract | 289 | 1.90 | 2.85 |  | 0.18 | 0.71 |
|  | waste water+ | 52 | <0.05 | 0.88 | 0.05 |  | 0.05 |
| 2-ethylhexanol | reextract | 220 | 1.90 | 1.20 |  | 0.18 | 0.65 |
|  | waste water | 123 | <0.05 | 2.52 | 0.05 |  | 0.09 |
| toluene | reextract | 281 | 1.75 | 1.41 |  | 0.16 | 0.65 |
|  | waste water | 63 | 0.12 | 2.35 | 0.05 |  | 0.09 |
| hydrocarbon mixture | reextract | 282 | 1.58 | 1.98 |  | 0.14 | 0.64 |
| (boiling range 140–170° C.) | waste water | 54 | 0.31 | 1.80 | 0.05 |  | 0.11 |
| cyclohexane | reextract | 284 | 1.62 | 1.98 |  | 0.13 | 0.63 |
|  | waste water | 62 | 0.27 | 2.27 | 0.05 |  | 0.11 |
| diethylether | reextract | 260 | 1.45 | 1.55 |  | 0.13 | 0.33 |
|  | waste water | 77 | 0.42 | 2.23 | 0.05 |  | 0.47 |
| (b) di-2-ethylhexylamine | | | | | | | |
| n-butanol | reextract | 301 | 1.87 | 3.12 |  | 0.19 | 0.72 |
|  | waste water | 36 | <0.05 | 0.64 | 0.05 |  | 0.05 |
| 2-ethylhexanol | reextract | 244 | 1.82 | 1.45 |  | 0.19 | 0.70 |
|  | waste water | 96 | 0.07 | 2.31 | 0.05 |  | 0.05 |
| toluene | reextract | 299 | 1.65 | 1.60 |  | 0.17 | 0.65 |
|  | waste water | 45 | 0.24 | 2.15 | 0.05 |  | 0.09 |
| hydrocarbon mixture | reextract | 305 | 1.39 | 2.20 |  | 0.12 | 0.68 |
| (boiling range 140–170° C.) | waste water | 35 | 0.49 | 1.54 | 0.05 |  | 0.07 |
| cyclohexane | reextract | 315 | 1.40 | 1.77 |  | 0.12 | 0.68 |
|  | waste water | 24 | 0.50 | 1.93 | 0.05 |  | 0.08 |
| diethylether | reextract | 291 | 1.46 | 1.59 |  | 0.13 | 0.63 |

TABLE 3-continued

| | | | | Examples IX-XXVI | | | | |
|---|---|---|---|---|---|---|---|---|
| content of catalyst solution | | | Rh mg/kg 345 | TPP TS % 1.92 | TPP OTS % 3.80 | TPP STS % 0.07 | TPP DS % 0.20 | TPP ODS % 0.77 |
| | | waste water | 51 | 0.43 | 2.20 | 0.05 | | 0.11 |
| (c) isotridecylamine | | | | | | | | |
| n-butanol | | reextract | 307 | 1.90 | 2.90 | | 0.18 | 0.69 |
| | | waste water | 34 | <0.05 | 0.83 | 0.05 | | 0.05 |
| 2-ethylhexanol | | reextract | 205 | 1.71 | 0.91 | | 0.19 | 0.65 |
| | | waste water | 123 | 0.17 | 2.87 | 0.05 | | 0.10 |
| toluene | | reextract | 278 | 1.65 | 1.42 | | 0.16 | 0.65 |
| | | waste water | 63 | 0.24 | 2.33 | 0.05 | | 0.08 |
| Hydrocarbon mixture | | reextract | 281 | 1.13 | 1.42 | | 0.11 | 0.60 |
| (boiling range 140–170° C.) | | waste water | 54 | 0.74 | 2.34 | 0.05 | | 0.14 |
| Cyclohexane | | reextract | 284 | 1.22 | 1.19 | | 0.13 | 0.49 |
| | | waste water | 62 | 0.68 | 2.59 | 0.05 | | 0.15 |
| Diethylether | | reextract | 260 | 1.28 | 1.11 | | 0.13 | 0.49 |
| | | waste water | 77 | 0.63 | 2.65 | 0.05 | | 0.16 |

+Waste water = catalyst solution after extraction

Examples XXVII–XXVIII 100 g each of the used catalyst solution of the Examples IX–XXVI is acidified with 6 g of concentrated sulfuric acid or with 3 g of acetic acid and then each is extracted with 100 g of isotridecylamine/toluene solution. The reextraction of the rhodium catalyst is carried out with caustic soda, which is added until a pH value of 12 is attained.

The two experiments, the results of which are given in Table 4, prove that both inorganic and organic acids can be used to acidify the used catalyst solution. At the same time it can be seen that partial extraction leads to a far better separation of TPPOTS.

TABLE 4

| | Examples XXVII and XXVIII | | | | | | |
|---|---|---|---|---|---|---|---|
| Content of catalyst solution | Rh mg/kg 345 | Fe mg/kg 270 | TPP TS % 1.92 | TPP OTS % 3.80 | TPP STS % 0.07 | TPP DS % 0.20 | TPP ODS % 0.77 |
| acidified with H₂SO₄ | | | | | | | |
| (a) extracted with amine (50% of theor. amount) 1st reextract | 225 | 3.1 | 1.50 | 0.25 | | 0.18 | 0.31 |
| (b) extracted with amine (a further 50% of theoretical amount) 2nd reextract | 114 | 5.8 | 0.39 | 1.13 | | | 0.29 |
| Content of catalyst solution after reextraction (91 g of solution recovered) acidified with acetic acid | 5.8 | 259 | | 2.76 | | | 0.12 |
| extracted with amine (100% of theoretical amount) Reextract | 315 | 39 | 1.90 | 0.65 | | 0.21 | 0.43 |
| Content of catalyst solution after extraction (92 g of solution recovered) | 27.6 | 249 | 0.09 | 3.14 | | | 0.34 |

Example XXIX 100 g of the catalyst solution of the Examples IX–XXVIII is acidified with 3 g of acetic acid. The catalyst solution is then extracted with 100 g of triisooctylamine/toluene solution. The reextraction of the rhodium catayst is carried out with caustic soda.

The results of the experiments are given in Table 5. They reconfirm the high selectivity of the separation of rhodium and TPPTS from TPPOTS.

TABLE 5

| | Example XXIX | | | | | | |
|---|---|---|---|---|---|---|---|
| | Rh mg/kg | Fe mg/kg | TPP TS % | TPP OTS % | TPP STS % | TPP DS % | TPP ODS % |
| Content of used catalyst solution acidified with acetic acid extracted with amine (100% of theoretical amount) | 345 | 270 | 1.92 | 3.80 | 0.07 | 0.20 | 0.77 |
| Reextraction | 170 | 16.5 | 1.67 | 0.1 | | 0.18 | 0.39 |
| Catalyst solution after extraction, 95 g | 164 | 237 | 0.22 | 3.75 | | | 0.32 |

What we claim is:

1. A process for recovering a catalyst system containing water-soluble rhodium, sulfonated aryl phosphines and at least one of alkali metal, alkaline earth metal, and ammonium comprising
    adding an amount of acid at least equivalent to sulfonic acid groups present in an aqueous solution of said catalyst system,
    then subjecting said system to extraction with a solution of an amine in an organic solvent to form a first aqueous phase and an organic phase,
    separating said organic phase from said aqueous phase,
    then mixing said organic phase with an aqueous solution of an inorganic base,
    whereby a second aqueous phase is formed containing purified rhodium-sulfonated aryl phosphine complex, and
    separating said second aqueous phase from said organic phase.

2. The process of claim 1 wherein said acid is added to said aqueous solution in the form of an amine salt.

3. The process of claim 1 wherein said amine is an open-chain, branched or unbranched aliphatic amine with 10 to 60 carbon atoms.

4. The process of claim 3 wherein said amine has 13 to 36 carbon atoms.

5. The process of claim 3 wherein said amine is iso-tridecylamine, di-2-ethylhexylamine, tri-n-hexylamine, tri-n-octylamine, tri-iso-octylamine, tri-iso-nonylamine, di-iso-nonyl-2-phenylpropylamine, iso-nonyl-di-2-phenylpropylamine, or tri-iso-tridecylamine.

6. The process of claim 5 wherein said amine is iso-tridecylamine, tri-n-octylamine or triisooctylamine.

7. The process of claim 1 wherein said amine is present in an amount of about 0.1 to about 1.0 mole per equivalent of said sulfonic acid groups.

8. The process of claim 7 wherein said amine is present in an amount of about 0.25 to about 0.75 mole per equivalent of said sulfonic acid groups.

9. The process of claim 1 wherein toluene or fractions resembling kerosene are used as a solvent for said amine.

10. The process of claim 1 wherein said extraction takes place in several steps.

11. The process of claim 10 characterized in that, in each step, 0.25 to 0.5 mol amine are added per equivalent of said sulfonic acid groups.

12. The process of claim 1 wherein said inorganic base is sodium hydroxide, potassium hydroxide, sodium carbonate, potassium carbonate, or alkaline earth metal hydroxide.

13. The process of claim 1 wherein said inorganic base is used in stoichiometric amount or in slight excess relative to the amine present.

14. The process of claim 1 wherein said aqueous solution of said inorganic base is a 0.1 to 10% by weight solution.

15. A process for the recovery of a catalyst system containing water-soluble rhodium, sulfonated aryl phosphines, and at least one of alkali metal, alkaline earth metal, and ammonium comprising adding an amount of acid at least equivalent to sulfonic acid groups present in an aqueous solution of said catalyst system, then subjecting said system to extraction with a solution of an open chain aliphatic amine having 10 to 60 carbon atoms wherein said amine is present in an amount of about 0.1 to about 1.0 mole per equivalent of said sulfonic acid groups and said solvent is selected from toluene and fractions resembling kerosene, to form a first aqueous phase and an organic phase, separating said organic phase from said aqueous phase, then mixing said organic phase with an aqueous solution of an inorganic base selected from sodium hydroxide, potassium hydroxide, sodium carbonate, potassium carbonate, and alkaline earth metal hydroxide in an amount such that said inorganic base is present in a stoichiometric amount or in slight excess thereof relative to said amine, whereby a second aqueous phase is formed containing purified rhodium-sulfonated aryl phosphine complex, and separating said second aqueous phase from said organic phase.

16. The process of claim 15 wherein said amine is selected from isotridecylamine, tri-n-octylamine, and triisooctyl amine, said amine being present in an amount of 0.25 to about 0.75 mole per equivalent of said sulfonic acid groups, and said aqueous solution of said inorganic base is a 0.1 to 10% by weight.

17. The process of claim 16 wherein said acid is added to said aqueous solution of said catalyst system in the form of an amine salt.

* * * * *